April 7, 1964 B. D. LOUGHLIN 3,128,437

BALANCED FREQUENCY DETECTOR CIRCUIT

Filed Jan. 24, 1961

3,128,437
Patented Apr. 7, 1964

3,128,437

BALANCED FREQUENCY DETECTOR CIRCUIT

Bernard D. Loughlin, Huntington, N.Y., assignor to Hazeltine Research, Inc., a corporation of Illinois Filed Jan. 24, 1961, Ser. No. 84,667
10 Claims. (Cl. 329—133)

Figure 1:
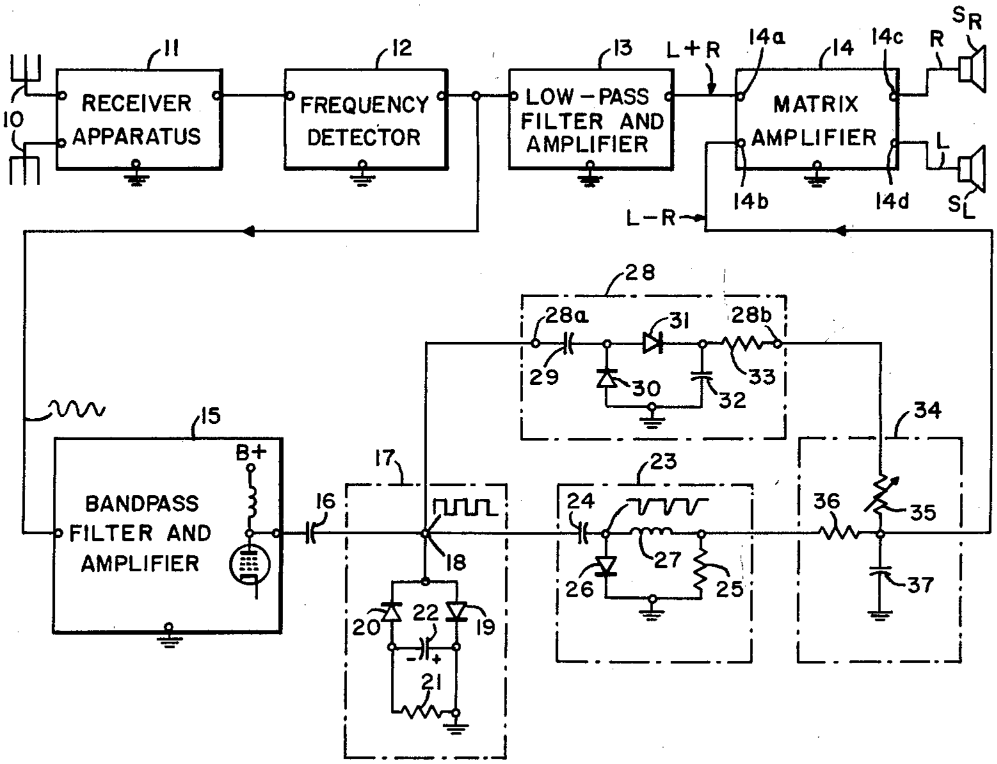

This invention relates to a balanced frequency detector circuit for use in the subcarrier channel of an FM/FM multiplex radio receiver. It is contemplated that the invention will be useful in receivers adapted to reproduce either stereophonic or subscription-type SCA (Subsidiary Communications Authorization) broadcast signals.

An FM/FM multiplex signal may consist of a main carrier frequency signal in the standard FM broadcast band of 88–108 megacycles, which is frequency-modulated by a subcarrier frequency signal of, for example, 42 kilocycles. Both the main carrier and subcarrier signals are frequency-modulated by respective audio-frequency information signals, which, for convenience, will be referred to according to the carriers on which they are directly modulated. In the case of a stereophonic broadcast signal, the two information signals may be the left and right halves of a single program source, or certain matrixed combinations thereof designed to permit compatible reception of both halves of the program source by conventional FM receivers. In the case of an SCA broadcast signal, the two information signals usually come from totally unrelated program sources, as, for example, where the main information signal may be a commercial program intended for home receivers, while the subscriber information signal may be background music for use by stores subscribing to this special service.

A radio adapted to receive either type multiplex broadcast signal has a frequency detector for detecting the main information signal and the modulated subcarrier. The main information signal may then be filtered out and utilized directly. However, in order to utilize the subcarrier information signal, an additional signal-translating channel, including a bandpass filter to exclude the main information signal and another frequency detector to demodulate the subcarrier, is added to the basic receiver. This additional channel, hereafter referred to as the subcarrier channel, should be capable of providing, at the output thereof, a good, clean information signal without any part of the main information signal appearing therein. When some of the main information signal does occur in the output of the subcarrier channel, there is said to be crosstalk of the main information signal into the subcarrier channel.

This crosstalk can result from amplitude modulation of the subcarrier at an audio rate corresponding to the audio frequencies of the main information signal, which modulation may not be completely suppressed either by the subcarrier frequency detector or by the amplitude limiter associated therewith. While the frequency detector operates to produce an output signal that is proportional to the deviation of the subcarrier from its mean frequency, it may also be inherently amplitude-sensitive, and thereby produce an additional audio output signal component that is proportional to the audio-frequency amplitude variations in the subcarrier.

Such amplitude modulation may occur in receivers having rounded-top IF (intermediate-frequency) bandpass characteristics. Also, even in receivers having flat-top IF characteristics, frequency deviation of the main carrier produced by the main information signal may be sufficiently large to cause the sidebands corresponding to the subcarrier frequencies to ride up and down the sloping sides of the IF pass bands, thereby varying the amplitude of the subcarrier frequency components appearing at the input of the subcarrier detector. In a similar manner, the subcarrier information signal itself may cause distortion of the audio signal wholly within the subcarrier channel.

The subjective effect to the listener of this undesired amplitude modulation of the subcarrier depends upon the type of broadcast signal being received. In the case of a stereophonic broadcast signal, it may result in a reduction in stereophonic separation, a loss of stereophonic balance, or combinations of both, depending on the type of matrixing used in the respective information signals. Where there is crosstalk in the case of the SCA subscription-type signals, the listener may actually hear the main program simultaneously with the subcarrier program. Although the main program may come through at a substantially reduced volume relative to the subcarrier program, it is often sufficiently loud to cause annoying interference. This is especially true where the main program is a voice, since voices have been found to produce one of the more noticeable forms of interference.

It is, therefore, an object of the present invention to provide a balanced frequency detector circuit for the subcarrier channel of an FM/FM multiplex signal receiver that avoids the foregoing difficulty of multiplex signal reception.

It is also an object of the present invention to provide an inexpensive and simply constructed balanced subcarrier channel frequency detector.

It is further an object of the present invention to provide, for the subcarrier channel of a multiplex signal receiver, an inexpensive balanced frequency detector with good amplitude-modulation rejection and that has linearity and sensitivity characteristics comparable to more expensive subcarrier frequency detectors.

It is finally an object of the present invention to provide a balanced subcarrier channel frequency detector that substantially reduces crosstalk of the main signal channel into the output of the subcarrier channel.

In accordance with the present invention, a balanced frequency detector circuit for the subcarrier channel of an FM/FM multiplex signal receiver comprises means for supplying a subcarrier signal which may be both frequency and amplitude modulated. The circuit also includes means for deriving from the subcarrier signal a train of pulses having an average amplitude component determined by the subcarrier frequency modulation and, at least in part, by the subcarrier amplitude modulation. There is also provided auxiliary detection means for deriving a measure of the subcarrier amplitude modulation and means for combining this derived measure of amplitude modulation with the pulse train to substantially remove any effect the subcarrier amplitude modulation has on the average amplitude modulation component of the pulse train.

For a better understanding of the present invention, together with other and further objects thereof, reference is had to the following description, taken in connection with the accompanying drawing, and its scope will be pointed out in the appended claims.

Figure 2:
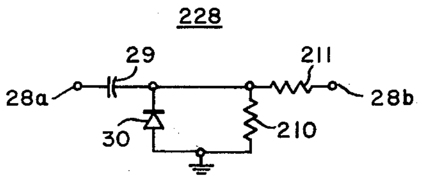

Referring to the drawing:

FIG. 1 is a combination block and circuit diagram of an FM/FM multiplex receiver specifically adapted to receive a stereophonic broadcast signal and which incorporates in the subcarrier channel a preferred form of balanced frequency detector circuit constructed in accordance with the present invention, and FIG. 2 is a circuit diagram of an alternative circuit useful as the auxiliary detector.

*General Description of FIG. 1 Receiver*

The receiver of FIG. 1 is constructed to receive a particular form of the above-described FM/FM multiplex broadcast signal, namely the stereophonic broadcast signal. Further, it is assumed that this stereophonic signal is of the type wherein the main carrier information signal is the sum of the left and right halves, $L+R$, of the program source and the subcarrier information signal is the difference between the two, $L-R$. This arrangement of the signal permits reproduction of the complete program with a conventional monoaural FM receiver, which operates to detect the main carrier signal, $L+R$, and ignores the subcarrier signal completely. To reproduce the program stereophonically, a special receiver is required, and it may be constructed in accordance with FIG. 1.

The receiver shown in FIG. 1 includes antenna system 10, coupled to the input of receiver apparatus 11 which may incorporate the usual radio-frequency amplifier, frequency converter, intermediate-frequency amplifier, and amplitude-limiter circuits associated with conventional monoaural FM receivers. The multiplex signal is then applied from the last intermediate-frequency amplifier stage of apparatus 11 to the input of frequency detector 12, which may be a conventional discriminator or ratio detector for detecting the audio-frequency information signal $L+R$ and the modulated subcarrier. The composite signal from the output of detector 12 is then applied to the input of low-pass filter and amplifier 13, preferably having a pass band sufficient to translate only the autdio-frequency signal, $L+R$. The signal $L+R$ is then coupled to one input terminal 14a of matrix amplifier 14, which unit is included for a purpose to be fully described hereinafter.

The composite detected signal at the output of detector 12 is also applied to the input of bandpass filter and amplifier 15, which should have a bandpass characteristic centered on the subcarrier frequency and a bandwidth capable of translating all the frequency-modulation components of the subcarrier. The bandpass filter of unit 15 should be carefully designed at the lower end of the pass band to substantially attenuate any of the higher audio-frequency components of the main signal $L+R$, thereby to prevent any direct feedthrough of the signal $L+R$ into the subcarrier channel. Also, any buffer amplifier stages located between detector 12 and the bandpass filter of unit 15 should be designed for linear operation, since any harmonics of the audio-frequency signal, $L+R$, produced by nonlinear operation of the amplifier may fall within the pass band of the filter and be translated into the subcarrier channel. The modulated subcarrier at the output of unit 15 is then limited and detected by means of units 17, 23, 28, and 34, in a manner to be fully described hereinafter, to produce the audio-frequency subcarrier information signal $L-R$, which is then amplified to a second input terminal 14b of matrix amplifier 14.

The signals $L+R$ and $L-R$ at matrix input terminals 14a and 14b, respectively, cannot be used directly for stereophonic sound reproduction since each signal effectively has both the left and right halves of the program source represented therein. The two signals must be suitably combined to produce the separate signals L and R. This can be done simply by adding the two signals to produce the left-half signal L and by subtracting the signal $L-R$ from the signal $L+R$ to produce the right-half signal R. Thus, unit 14 may include conventional adder and subtractor circuits to combine signals $L+R$ and $L-R$ in the manner just described to produce the signal R at output terminal 14c and the signal L at output terminal 14d. Amplifier stages may be included in unit 14 to raise the level of the signals R and L to a suitable value for their direct application to right and left speakers $S_R$ and $S_L$, respectively.

It should be emphasized that a stereophonic receiver has been shown by way of illustration only and that the balanced frequency detector of the invention, hereinafter described, will be equally useful in any form of FM/FM multiplex receiver, whether or not the main information signal is actually utilized.

*Description of FIG. 1 Balanced Frequency Detector*

That portion of the subcarrier channel that is used to detect the audio-frequency signal $L-R$ from the subcarrier signal will now be considered. Specifically, there is provided a balanced frequency detector circuit which includes means such as bandpass filter and amplifier unit 15 for supplying the above-described subcarrier signal. In accordance with the stereophonic system of FIG. 1, the subcarrier signal is frequency-modulated by the information signal $L-R$ and, under ideal circumstances, that would be the only modulation of the subcarrier signal. However, as it has been previously explained, the subcarrier signal may also be amplitude-modulated, either by a second signal which may correspond to the main carrier audio-frequency signal $L+R$ or audio-frequency noise, or else it may be amplitude-modulated by the subcarrier audio signal $L-R$, for example deriving large frequency deviations.

There is also provided in the balanced frequency detector means for deriving from the subcarrier signal a train of pulses having an average amplitude component determined by the subcarrier frequency modulation and, at least in part, by the subcarrier amplitude modulation. Included in this pulse-deriving means is variable threshold limiter circuit 17, to which the subcarrier signal is supplied by capacitor 16 from the plate of a pentode amplifier circuit in unit 15. In the following description of limiter circuit 17, it will be assumed that the limiter is driven by an inductance of 50 millihenries in the plate circuit of the pentode amplifier.

Limiter circuit 17 clips the subcarrier signal to produce a symmetrical square-wave signal having a peak-to-peak amplitude that is a fixed percentage of the peak-to-peak value of the supplied subcarrier signal. To this end, limiter circuit 17 includes diode 19, conductively coupled from terminal 18 to ground, to clip off the positive peaks of the applied subcarrier and diode 20, conductively coupled from ground through the parallel combination of load resistor 21 and capacitor 22 back to terminal 18, to clip off the negative peaks. The peak-to-peak amplitude of the negative signal is determined by the voltage across resistor 21 which, in turn, depends upon the value of resistor 21, the latter being selected as a compromise between a higher output with a higher value resistance and better downward handling capability with a lower value resistance. Bypass capacitor 22, connected across resistor 21, holds the clipping level relatively constant in the presence of incidental amplitude modulation occurring at an audio-frequency rate. The reason for limiter circuit 17 being of the variable threshold type is that, if there are any long-term variations in the amplitude of the composite signal at the output of the first frequency detector 12 that directly result in corresponding variations of the main audio-frequency information signal $L+R$ at matrix input terminal 14a, these variations will be followed by corresponding variations in the amplitude of the subcarrier audio-frequency signal $L-R$ at matrix input terminal 14b, thereby ensuring proper stereophonic operation of the receiver. This aspect of the stereophonic receiver of FIG. 1 constitutes the subject matter of applicant's copending applicaion Serial No. 89,895, filed January 24, 1961.

The pulse-deriving means also includes a pulse-counter circuit 23, in which capacitor 24 and resistor 25 are connected in series from limiter terminal 18 to ground to form a differentiator circuit for deriving a train of positive and negative pulses from the leading and trailing edges of the square-wave limited signal. Diode 26 is conductively connected from capacitor 24 to ground to remove the positive pulses and to clamp the base of the remaining train of negative pulses at ground potential. The derived differentiated pulses are waveshaped by inductor 27, connected between capacitor 24 and resistor 25, to increase the pulse area and to provide, in conjunction with diode 26, a sharp cutoff at the end of the pulse rather than the drawn-out time constant of conventional differentiated pulses. In this way, the audio recovery capability (i.e., sensitivity) and linearity of circuit 23 are improved over simple pulse-counter circuits. This feature of the circuit of FIG. 1 is the subject matter of applicant's copending application Serial No. 84,636, filed January 24, 1961.

According to conventional pulse-counter operation, as long as the area of each of the negative pulses remains constant, the average value of the train of pulses is directly proportional to their repetition rate. Thus, as the repetition rate varies as a function of subcarrier frequency modulation, dynamic variations in the average voltage are produced, which variations comprise the detected audio-frequency signal *L—R*. The foregoing explanation has assumed that the area of the pulses remains constant. However, in a case where the square-wave limited signal is varying in amplitude, the pulse area is not constant and varies as the amplitude of the limited signal varies. While, as described above, bypass capacitor 22 holds the clipping level relatively constant in the presence of audio-frequency subcarrier amplitude modulation, there is, nevertheless, a certain amount of amplitude variation in the limited signal caused, at least in part, by the finite forward resistance of diodes 19 and 20. This, in effect, causes dynamic variations in the value of the average amplitude component of the pulse train which are determined by the amplitude modulation of the subcarrier. More specifically, they are directly determined by the amplitude modulation that is not completely suppressed in limiter circuit 17. In the case where the subcarrier is both frequency and amplitude modulated, the net dynamic variations are a function of the product of the frequency and amplitude modulation of the subcarrier. This amplitude sensitivity of the detector results in the interference with the desired audio signal *L—R*.

In order to substantially remove this interference, the balanced frequency detector circuit includes auxiliary detector circuit 28 for deriving a measure of this undesired amplitude modulation of the subcarrier. To that end, the square-wave limited signal at terminal 18 of limiter circuit 17 is connected through capacitor 29 to a double-diode peak rectifier circuit including diodes 30 and 31, and the usual filter circuit of capacitor 32 and resistor 33. Diode 30 clamps the negative peak of the applied square-wave signal to ground, while diode 31 conducts on the positive peaks to produce, in filter circuit 32, 33, a signal that varies as a function of the subcarrier amplitude modulation but which is in inverse polarity to the aforementioned dynamic variations in the average component of the pulse train in counter circuit 23.

Signal-combining circuit 34 is provided in the balanced frequency detector to combine the signal from amplitude detector 28 with the output of pulse-counter circuit 23 to substantially remove from the train of negative pulses the average amplitude component produced by the amplitude modulation of the subcarrier signal. Circuit 34 may include adjustable resistor 35, connected to the output of the integrating circuit of resistor 36 and capacitor 37. The integrating circuit is responsive to the pulses to filter out the components of the pulse train occurring at the subcarrier frequency, and may additionally serve as the required de-emphasis circuit compensating, in a conventional manner, for the pre-emphasis of the high-frequency components of the audio-frequency signal at the transmitter. Since the distortion produced in the pulse-counter circuit is the product of the subcarrier frequency modulation and the subcarrier amplitude modulation, the amount of distortion is essentially frequency-dependent. On the other hand, the detected voltage in auxiliary detector 28 is insensitive to frequency variations. Therefore, resistor 35 is made to be adjustable so that the balance of the frequency detector may be adjusted for optimum operation at any desired basic subcarrier frequency.

While applicant does not wish to be limited to any particular set of circuit constants, the following have proved useful in the detector circuit of the present invention.

| | | |
|---|---|---|
| Resistor 21 | kilohms | 27 |
| Resistor 25 | do | 33 |
| Resistor 33 | do | 330 |
| Resistor 35 | megohms | 1 |
| Resistor 36 | kilohms | 100 |
| Capacitor 16 | microfarads | .01 |
| Capacitor 22 | do | 8.0 |
| Capacitor 24 | micromicrofarads | 100 |
| Capacitor 29 | do | 470 |
| Capacitor 32 | do | 220 |
| Capacitor 37 | do | 1500 |
| Inductor 27 | millihenries | 50 |
| All diodes | | Type 1N34AS |

In FIG. 2 a modified form of the amplitude-modulation detector 28 is shown and may be used where it is desired to reduce the cost of the balanced frequency detector. Specifically, the detector 228 shown therein comprises a single-diode half-wave AM detector. In an actually constructed embodiment the values of resistors 210 and 211 are both 100 kilohms. The operation of the blanced frequency detector utilizing the detector 228 is essentially the same as that of FIG. 1.

While there has been described what is, at present, considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A balanced frequency detector circuit for the subcarrier channel of an FM/FM multiplex signal receiver comprising: means for supplying a subcarrier signal which may be both frequency and amplitude modulated; means for deriving from said subcarrier signal a train of pulses having an average amplitude component determined by said subcarrier frequency modulation and, at least in part, by said subcarrier amplitude modulation; auxiliary detection means for deriving a measure of said subcarrier amplitude modulation; and means for combining said derived measure of amplitude modulation with said pulse train to substantially remove any effect said subcarrier amplitude modulation has on the average amplitude component of the pulse train.

2. A balanced frequency detector circuit for the subcarrier channel of an FM/FM multiplex signal receiver comprising: means for supplying a subcarrier signal which may be both frequency and amplitude modulated; pulse-deriving means, including means for amplitude-limiting said subcarrier in a manner that may be ineffective to suppress all of said amplitude modulation, for deriving from said subcarrier a train of pulses having an average amplitude component determined by said subcarrier frequency modulation and by any of said amplitude modulation of the subcarrier that is not suppressed by the amplitude limiter; auxiliary detection means for deriving a measure of said amplitude modulation; and means for combining said derived measure of amplitude modulation with said pulse train to substantially remove any effect said subcarrier amplitude modulation has on the average component of the pulse train.

3. A balanced frequency detector circuit for the subcarrier channel of an FM/FM multiplex signal receiver comprising: means for supplying a subcarrier signal which may be both frequency and amplitude modulated; pulse-deriving means, including means for amplitude-limiting said subcarrier in a manner ineffective to suppress all of said amplitude modulation, for deriving from said limited signal a train of pulses having an average amplitude component determined by said subcarrier frequency modulation and by said subcarrier amplitude modulation, the latter causing dynamic variations in said component of one polarity; auxiliary detection means for deriving a measure of said amplitude modulation in inverse polarity to said dynamic variations; and means for combining said derived measure of amplitude modulation with said pulse train to substantially remove any effect said subcarrier amplitude modulation has on the average component of the pulse train.

4. A balanced frequency detector circuit for the subcarrier channel of an FM/FM multiplex signal receiver comprising: means for supplying a subcarrier signal which may be both frequency and amplitude modulated; pulse-deriving means, including means for amplitude-limiting said subcarrier in a manner that may be ineffective to suppress all of said amplitude modulation, for deriving from said subcarrier a train of pulses having an average amplitude component determined by said subcarrier frequency modulation and by any of said amplitude modulation of the subcarrier that is not suppressed by the amplitude limiter; auxiliary detection means responsive to said limited signal for deriving therefrom a measure of the amplitude modulation not suppressed by the amplitude-limiting means; and means for combining said derived measure of amplitude modulation with said pulse train to substantially remove any effect said subcarrier amplitude modulation has on the average component of the pulse train.

5. A balanced frequency detector circuit for the subcarrier channel of an FM/FM multiplex signal receiver comprising: means for supplying a subcarrier signal which may be both frequency and amplitude modulated; means for deriving from said subcarrier a train of pulses having an average amplitude component determined by said subcarrier frequency modulation and by said subcarrier amplitude modulation, the latter causing dynamic variations in said component of one polarity; an amplitude detector circuit responsive to said limited signal for detecting said subcarrier amplitude modulation in inverse polarity to said dynamic variations; and means for combining said detected amplitude modulation with said pulse train to substantially remove any effect said subcarrier amplitude modulation has on the average amplitude component of the pulse train.

6. A balanced frequency detector circuit for the subcarrier channel of an FM/FM multiplex signal receiver comprising: means for supplying a subcarrier signal which may be both frequency and amplitude modulated; means for deriving from said subcarrier a train of pulses having an average amplitude component determined by said subcarrier frequency modulation and by said subcarrier amplitude modulation, the amount of effect said amplitude modulation has on said average component being dependent on the frequency of the subcarrier; auxiliary detection means for deriving a measure of said amplitude modulation that is insensitive to subcarrier frequency; and means including an adjustable impedance for combining an adjustable amount of said measure of amplitude modulation with said pulse train to permit complete removal of any effect said amplitude modulation has on said average component for at least one value of subcarrier frequency and to permit substantial removal thereof for any other values of subcarrier frequency.

7. A balanced frequency detector circuit for the subcarrier channel of an FM/FM multiplex signal receiver comprising: means for supplying a subcarrier signal which may be both frequency and amplitude modulated; means for deriving from said subcarrier signal a train of pulses having an average amplitude component determined by said subcarrier frequency modulation and, at least in part, by said subcarrier amplitude modulation; auxiliary detection means including a double-diode peak rectifier circuit for detecting said subcarrier amplitude modulation; and means for combining said detected measure of amplitude modulation with said pulse train to substantially remove any effect said subcarrier amplitude modulation has on the average amplitude component of the pulse train.

8. A balanced frequency detector circuit for the subcarrier channel of an FM/FM multiplex signal receiver comprising: means for supplying a subcarrier signal which may be both frequency and amplitude modulated; pulse deriving means, including means for amplitude-limiting said subcarrier in a manner ineffective to suppress all of said amplitude modulation, for deriving from said limited signal a train of pulses having an average amplitude component determined by said subcarrier frequency modulation and by said subcarrier amplitude modulation, the latter causing dynamic variations in said component of one polarity; auxiliary detection means including a double-diode peak rectifier circuit for detecting, from the limited signal, the amplitude modulation not suppressed by the amplitude-limiter means an inverse polarity to said dynamic variations; and means for combining said detected measure of amplitude modulation with said pulse train to substantially remove any effect said subcarrier amplitude modulation has on the average component of the pulse train.

9. A balanced frequency detector circuit for the subcarrier channel of an FM/FM multiplex signal receiver comprising: means for supplying a subcarrier signal which may be both frequency and amplitude modulated; means for deriving from said subcarrier signal a train of pulses having an average amplitude component determined by said subcarrier frequency modulation and, at least in part, by said subcarrier amplitude modulation; auxiliary detection means including a single-diode half-wave rectifier circuit for detecting said subcarrier amplitude modulation; and means for combining said detected measure of amplitude modulation with said pulse train to substantially remove any effect said subcarrier amplitude modulation has on the average amplitude component of the pulse train.

10. A balanced frequency detector circuit for the subcarrier channel of an FM/FM multiplex signal receiver comprising: mean for supplying a subcarrier signal which may be both frequency and amplitude modulated; pulse-deriving means, including means for amplitude-limiting said subcarrier in a manner ineffective to suppress all of said amplitude modulation, for deriving from said limited signal a train of pulses having an average amplitude component determined by said subcarrier frequency modulation and by said subcarrier amplitude modulation, the latter causing dynamic variations in said component of one polarity; auxiliary detection means including a single-diode half-wave rectifier circuit for detecting from the limited signal the amplitude modulation not suppressed by the amplitude-limited means an inverse polarity to said dynamic variations; and means for combining said detected measure of amplitude modulation with said pulse train to substantially remove any effect said subcarrier amplitude modulation has on the average component of the pulse train.

References Cited in the file of this patent

UNITED STATES PATENTS

| | | |
|---|---|---|
| 2,241,382 | Sziklai | Aug. 5, 1941 |
| 2,282,971 | Koch | May 12, 1942 |
| 2,491,921 | Hepp | Dec. 20, 1949 |